United States Patent [19]

Ikebukuro et al.

[11] 4,195,777
[45] Apr. 1, 1980

[54] HOT WATER HEATING SYSTEM

[75] Inventors: Munemitsu Ikebukuro, Kariya; Masao Yamaguchi, Aichi, both of Japan

[73] Assignee: Nippondenso Co., Ltd., Kariya, Japan

[21] Appl. No.: 873,479

[22] Filed: Jan. 30, 1978

[30] Foreign Application Priority Data

Feb. 3, 1977 [JP] Japan .................................. 52/11152
Jul. 1, 1977 [JP] Japan .................................. 52/79213
Jul. 12, 1977 [JP] Japan .................................. 52/83948

[51] Int. Cl.² .............................................. B60H 1/02
[52] U.S. Cl. ............................ 237/12.3 B; 123/41.1; 137/871; 137/877; 137/887
[58] Field of Search ................... 237/12.3 B, 8 C; 137/867, 868, 871, 877, 881, 887; 123/41.08, 41.1

[56] References Cited

U.S. PATENT DOCUMENTS

| 2,028,069 | 1/1936 | Horton | 237/8 C X |
| 2,490,919 | 12/1949 | Raney | 237/12.3 B X |
| 3,302,696 | 2/1967 | Rogers | 237/12.3 B X |
| 3,889,879 | 6/1975 | Wellman et al. | 237/12.3 B |
| 3,966,119 | 6/1976 | Harter et al. | 237/12.3 B |

*Primary Examiner*—Lloyd L. King
*Assistant Examiner*—William E. Tapolca
*Attorney, Agent, or Firm*—Cushman, Darby & Cushman

[57] ABSTRACT

An improved hot water heating system used with an internal combustion engine is disclosed. This system provides a hot water flow control arrangement in which hot water supplied to a heating radiator is controlled by a valve and a pressure responsive bypassing means to keep a comfortable temperature. The pressure responsive bypassing means is closed when the maximum heating capacity is required to avail to the heating radiator all the hot water supplied by the engine even when the hot water pressure increases to exceed a bypassing pressure level.

7 Claims, 10 Drawing Figures

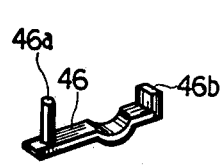
FIG. 3
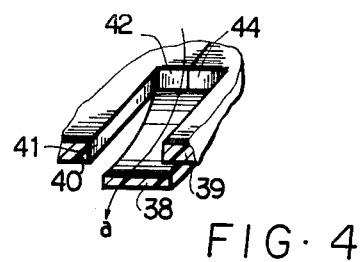
FIG. 4
FIG. 5
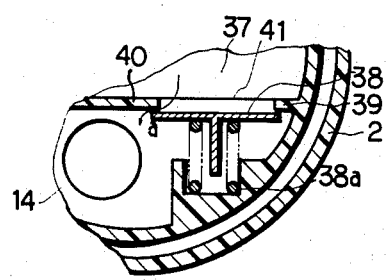
FIG. 6
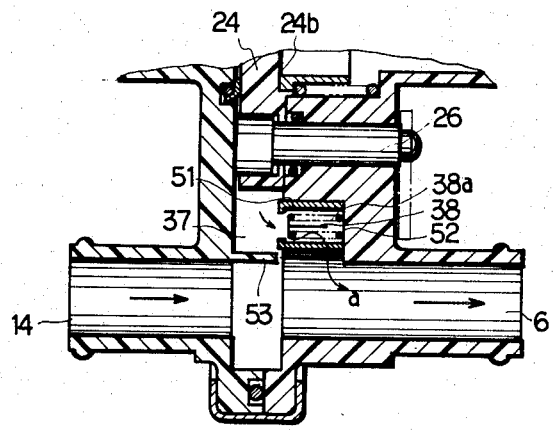

4,195,777

HOT WATER HEATING SYSTEM

BACKGROUND OF THE INVENTION

This invention relates to an improvement in a hot water heating system for use with an internal combustion engine.

In a conventional heating system in which engine cooling water is supplied to a heating radiator for heating air flowing therethrough, a hot water flow control valve is provided with a pressure regulating valve which is connected to return the hot water supplied from the cooling water outlet of the engine to the cooling water inlet of the engine when the pressure of the hot water exceeds a predetermined value, thereby controlling hot water supplied into the heating radiator within a predetermined flow rate thus maintaining a confortable air temperature.

In the above type, therefore, the maximum heating capacity is limited by the pressure regulating valve.

SUMMARY OF THE INVENTION

It is, therefore, a primary object of the present invention to provide an improved hot water heating system whose maximum heating capacity is not limited by a pressure regulating valve.

It is another object of the present invention to provide a hot water heating system of an increased maximum heating capacity, said system comprising a water flow control valve which is provided with an additional valve function for interrupting hot water from bypassing through the pressure regulating valve irrespective of the pressure of the hot water when the maximum heating capacity is required.

It is another object of the present invention to provide a hot water heating system of an increased maximum heating capacity without decreasing an engine cooling effect, said system comprising a water flow control valve which is provided with an additional valve function for interrupting hot water from bypassing through the pressure regulating valve irrespective of the pressure of the hot water when the maximum heating capacity is required and when the water flow control valve is fully closed to interrupt the hot water from flowing into the heating radiator.

It is a further object of the present invention to provide a unitary flow control apparatus in a simple structure for use with the above system.

Other objects and features will become apparent from the following description and drawings.

BRIEF DESCRIPTION OF THE DRAWINGS

FIGS. 1 and 2 show sectional views of an embodiment according to the present invention, in which FIG. 1 shows a circuit diagram with a sectional side view of the main portion cut along line I—I shown in FIG. 2 and FIG. 2 shows a sectional front view cut along line II—II in FIG. 1, FIGS. 3 and 4 show main components of the embodiment shown in FIG. 2, FIGS. 5 and 6 show fragmentary sectional front and side views of embodiments modified from that shown in FIG. 1 and 2, FIGS. 7 and 8 show another embodiment according to the present invention, in which

DESCRIPTION OF THE PREFERRED EMBODIMENTS

Figure 1:
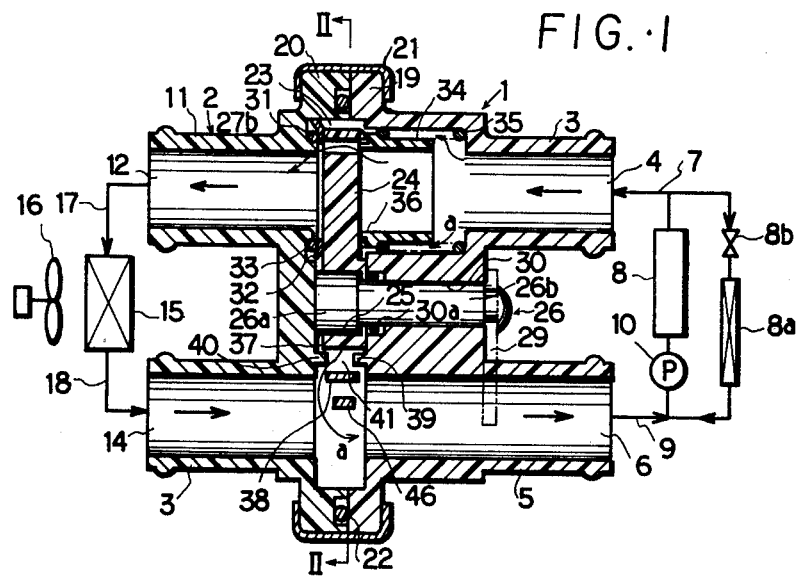

In FIGS. 1 through 4, numerals 1 and 2 respectively indicate a first and a second cases generally made of heat resistive synthetic material such as polyacetal and the like (so called Duracon, or 66 nylon). Die-cast metal such as aluminum or zinc is also available thereto. The first case 1 is formed with a couple of tubes 3, and 5 into which a couple of passages 4 and 6 are respectively opened. The above upper and lower passages 4 and 6 are connected across an engine through respective passages 7 and 9 and a water pump 10 in a well known manner. Also connected between the passages 7 and 9 are an engine cooling radiator 8a and a well-known thermostat valve.

Figure 2:
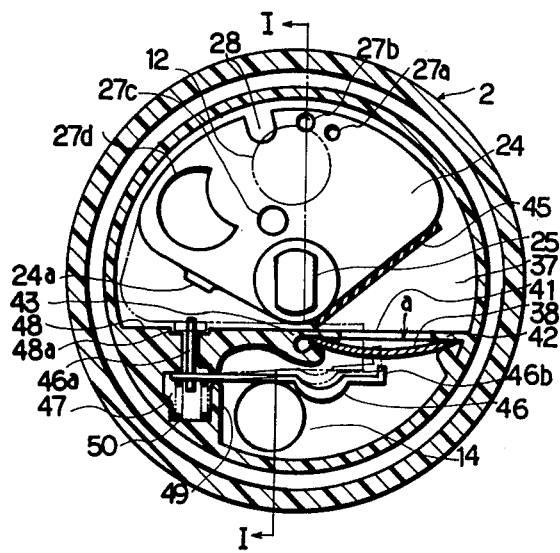

The second case 2 is also formed with a couple of tubes 11 and 13 having respective passages 12 and 14 therein which are connected across a heating radiator 15 through passages 17 and 18. The both cases further formed with flanges 19 and 20, around which an annular metal binder 21 are fitted to secure the both cases together. Between the both flanges, an O ring 22 or annular rubber sheet is disposed for sealing. In a space 23 formed by the both cases 1 and 2, a fan-shaped valve plate 24 is disposed. The valve 24 is preferably made of metal or heat resistive synthetic material such as polyacetal or 66 nylon and is formed on its left side (viewed in FIG. 2) a projection 24a and at its base portion a rectangular aperture 25. The aperture 25 receives a shaft 26 made of brass or the like as shown in FIGS. 1 and 2 so that the valve plate 24 can be rotated by the shaft 26. The valve plate 24 is provided with a plurality of different sized apertures 27a, 27b, 27c and 27d with their sizes increasing with the above order. A groove 28 is also formed on the arched outer periphery of the flow control valve 24 for the purpose same as the above described apertures. When the valve 24 is turned to the left most position 1 hot water flow is completely shut off. When the valve 24 is turned from the left to the right, the hot water is allowed to flow increasingly through the apertures 27a, 27b, 28, 27c and 27d. A lever 29 is connected to the shaft 26 at the end opposite to the valve plate 24. The lever 29 is a part of a link motion mechanism remotely controlled from a control panel not shown in a well known manner. Numeral 30 indicates an aperture formed in the first case for rotatably receiving the shaft 26. 30a is an O ring for sealing the gap formed between the first case 1 and the shaft 26.

31 indicates an annular groove formed in the second case 2, in which are disposed a resilient annular sealing plate 32 made of stainless, high carbon steel or heat resistive synthetic resin such as polyacetal or 66 nylon and an O ring 33. A flanged cylindrical spring guide 34 made of polyacetal or the like carries a coil spring 35 on the periphery thereof to urge the flow control valve plate 24 against the sealing plate 32. The spring guide 34 is formed with an annular groove 36 on the surface contacting the valve plate 24, thereby enlarging the contacting area.

Numeral 37 indicates a bypassing passage formed between the first and second cases 1 and 2 to bypass hot water in the upper passage 4 to the lower passage 6 both of the first case 1 as indicated by an arrow a. A bypassing valve 38 is disposed in the bypassing passage 37 as shown in FIGS. 2, and 4 to open or close the bypassing passage 37 in response to the pressure of the hot water flowing therethrough. The bypassing valve 38 is made of resilient metal such as stainless steel so that it deforms to open or close in response to the water pressure exerted thereon. FIG. 4 shows a half-cut bypassing valve arrangement being in the opening state, in which numerals 39 and 40 respectively indicate valve seats integrally formed on the first and second cases 1 and 2, 41 a valve aperture, and numerals 42 and 44 are valve supports integrally formed in the cases 1 and 2. The other half-cut of the bypassing valve arrangement (not shown) is the same in construction. The flow control valve plate 24 carries, on its side surface facing the bypassing valve 38, a sealing sheet 45 made of silicon rubber or other heat resistive sealing material. The sealing sheet 45 is seated on the valve supports 42 and 44 when the flow control valve 24 is turned to the right as viewed in FIG. 2 to obtain the maximum heating capacity to thereby close the valve aperture 41. A lever 46 having a pin 46a and a projection 46b is disposed in the space with the portion to which the pin 46a is secured being disposed in a chamber 47. The pin 46a projects from a stopper surface 48 through a recess 48a, into which the projection 24a enters to push the pin 46a when the flow control valve is turned to the left in FIG. 2. The projection 46b of the lever 46 is positioned right under the bypassing valve 38 to face the same. 49 indicates a lever supporting portion which catches the lever 46 on its both sides to provide a fulcrum thereof. A coil spring 50 is disposed in the chamber 47 to urge the pin 46a upward. When the pin 46a is pushed by the projection 24a, the lever 46 rotates about the lever supporting portion 49 to lift the projection 46b, thereby pushing the bypassing valve 38 to close the aperture 41.

Next will be explain the operation of the above embodiment.

When heating is not required, the flow control valve 24 is turned to rest on the left most position, where the hot water supplied from the engine is shut off and the projection 24a thereof pushes the pin 46a of the lever 46, and, accordingly, the bypassing valve is closed as shown by double-dotted chain lines in FIG. 2.

As a result, even when the pressure of the engine coolant exceeds a valve for opening the bypassing valve 38, no coolant bypasses therethrough so that all the engine coolant can be utilized to cool the engine, which is very effective in summer.

When moderate heating is required, the flow control valve 24 is turned from the left most position to a medium position where one of apertures 27a, 27b, 28 and 27c communicates the right passage 4 and the left passage 12 so that hot water is supplied from the engine 8 to the heating radiator 15 through the passages 7, 4, one of the above apertures (in FIG. 1, 27b is illustrated), passages 12 and 17. When the pressure of the hot water supplied from the engine by the water pump 10 increases as engine speed increases, the pressure difference between the pressure on the both sides of the bypassing valve increases finally to open same so that the hot water bypasses from the upper passage 4 to the lower passage 6 through the valve as indicated by arrows a. On the other hand, the bypassing valve 38 closes when the hot water pressure decreases, thus regulating the hot water pressure. Consequently, flow rate of the hot water supplied to the heating radiator 15 is maintained constant irrespective of engine speed or other factors for varying the hot water pressure, once the flow control valve 24 has been positioned in a desired place. As a result, a constant heating temperature can be assured.

When the flow control valve 24 is turned to the extreme right to obtain the maximum heating capacity, the widest aperture 27d of the flow control valve 24 comes into communication with both the right and left passages 4 and 12 so that the maximum flow rate of the hot water can be attained. At the same time, the aperture 41 is closed by the sealing sheet 45 so that no bypassing hot water flows through the bypassing valve irrespective of the hot water pressure. As a result, all the hot water flowing through the passages 7 and 4 can be supplied to the heating radiator, thus ensuring the maximum heating capacity when the hot water pressure increases.

FIG. 5 and FIG. 6 show respectively modified bypassing valve 38. FIG. 5 shows a valve 38 having T shaped cross section and a coil spring 38a urging the valve against the valve seats 39 and 40. FIG. 6 shows a similar T shaped valve 38 disposed in a support tube 51 having a flanged opening on which the valve is seated and a coil spring 38a. The tube 51 is disposed in a recess 52 formed in the first case so that the front surface 24b of the flow control valve plate 24 slides on the flanged opening of the support tube 51 to close same when the flow control valve plate 24 is turned to the right most position. Numeral 53 is a partition integrally formed on the second case to shut off the bypassing hot water flow in cooperation with the valve plate 24.

The lever 46 can be omitted if the engine cooling capacity of the engine radiator is large enough to prevent overheating even when the bypassing valve opens to bypass the engine coolant in very hot summer.

Figure 7:
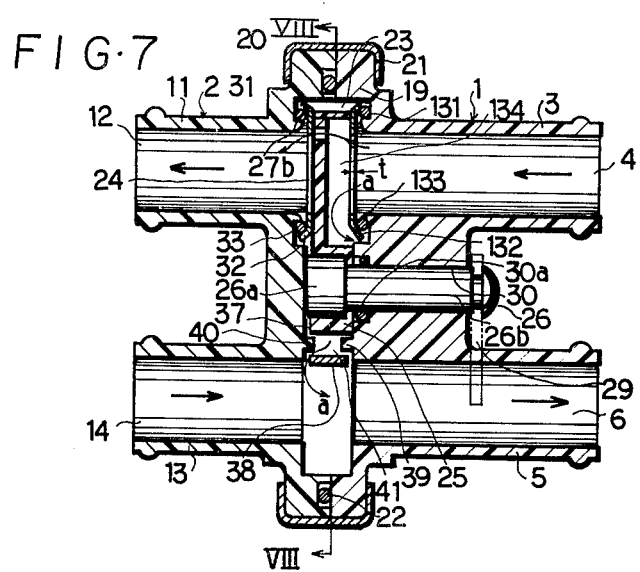
FIG. 7 is a sectional side view cut along line VII—VII in FIG. 8
Figure 8:
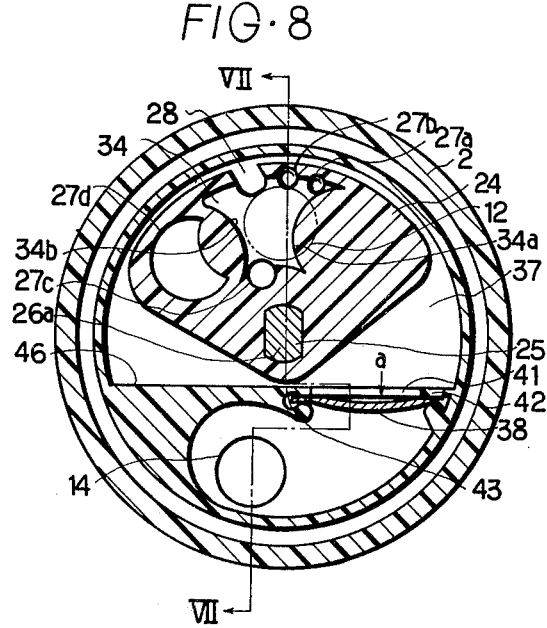
FIG. 8 is a sectional front view cut along line VIII—VIII in FIG. 7.

FIG. 7 shows another embodiment of the present invention, in which same numerals indicate same or equivalent members or portions. In the above embodiment, the flow control valve plate is mainly different from the former embodiment. It is noted that the lever 46 of the former embodiment is not necessary to ensure the engine cooling effect in hot summer.

Figure 9:
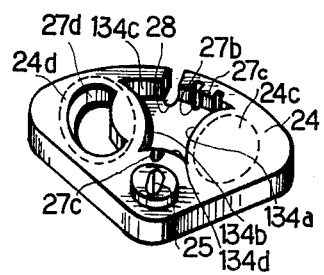
FIG. 9 is a perspective view showing a main component of the embodiment shown in FIG. 8.

In order to save such a lever, the flow control valve plate 24 is formed with a bypassing recess 134 and lands 24c and 24d as shown in FIG. 9. The valve plate 24 is disposed between the cases 1 and 2 in the same manner as the first embodiment. Numeral 131 indicates an annular groove formed in the first case 1 in which an annular sealing plate 132 is disposed between the valve plate 24 and an O ring 133. The annular sealing plate 132 and the O ring 133 are the same in construction as the sealing plate 32 and the O ring 33.

In the flow control valve plate 24, the lands 24c and 24d (dotted lines) and the bypassing recess 134 which is formed between the above lands to be communicated with the bypassing passage 37 as shown in FIG. 7 by an arrow a are respectively formed. The recess 134 is surrounded by arched walls 134a, 134b, 134c and 134d and the widest aperture 24d is surrounded by the land 24d which covers the flat portion of the annular sealing plate 132 so that when the valve plate 24 comes into the maximum heating position.

The operation is substantially the same as the former embodiment except for the cases where the flow control valve plate 24 rests on the left most position and on the right most position. When the valve plate 24 rests on the left most position heating hot water to be supplied to the heating radiator is interrupted by the flow control valve plate 24 at the land portion 24c. At the same time, the land of the valve plate 24 closes the bypassing passage 37, thereby preventing the hot water from bypassing therethrough. As a result, even under a high water pressure where the bypassing valve otherwise opens, all the engine coolant is utilized for engine cooling and, therefore, engine over-heating in hot summer can be effectively prevented.

When the valve plate 24 rest on the right most position, the widest aperture 27d comes into communication with the right and left passages 4 and 12 to supply the maximum rate of hot water to the heating radiator. At the same time, the land portion 24d which surrounds the aperture 27d comes into contact with the flat portion of the sealing plate 132, thereby interrupting the hot water flowing to the bypassing valve 38. As a result, even under a high water pressure where the bypassing valve otherwise opens, all the hot water supplied from the engine to passage 7 can be utilized for heating and, therefore, the maximum heating capacity is enhanced.

Figure 10:
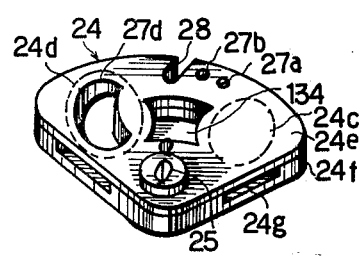
FIG. 10 is a perspective view showing a main component modified from same shown in FIG. 9.

For the flow control valve plate 24 of the second embodiment, a modified valve plate 24 shown in FIG. 10 can be substituted.

This modified valve plate 24 comprises a pair of plate members 24e and 24f. In the plate member 24e, a groove 24g is formed so that it communicates the recess 134 which is solely formed in the upper plate member 24e with the bypassing passage 37 therethrough. The function of the valve plate is substantially the same as that shown in FIG. 9.

What is claimed is:

1. A hot water heating system including:
   an internal combustion engine having a cooling water inlet, a cooling water outlet and an engine cooling radiator,
   a heating radiator having a hot water inlet and a hot water outlet,
   a hot water supplying circuit including a first passage connecting the cooling water outlet of said engine and the hot water inlet of said heating radiator, and a second passage connecting the hot water outlet of said heating radiator and the cooling water inlet of said engine, and
   means disposed in said hot water supplying circuit for controlling the hot water supplied to said heating radiator,
   said means comprising:
   a first tube disposed in said first passage,
   a second tube disposed in said second passage,
   a bypassing member connected between said first and second tube and having a bypassing passage and a pressure responsive valve to bypass the hot water in said first tube to said second tube when the hot water pressure exceeds a predetermined value, and
   a main valve disposed in one of said first and second tubes for opening and closing to control hot water supplied to said heating radiator, said main valve member having an additional valve member for closing the bypassing passage when it fully opens.

2. A hot water heating system according to claim 1, wherein
   said means comprises a unitary casing integrally formed with said first tube, second tube and bypassing passage, said casing further having therein said main valve and said pressure responsive valve.

3. A hot water heating system according to claim 2, wherein
   said main valve comprises a fan-shaped valve plate member having a plurality of different sized apertures and a shaft secured to said plate member.

4. A hot water heating system according to claim 3, wherein
   said valve plate comprises
   said additional valve member on its side surface.

5. A hot water heating system according to claim 4, wherein
   said means further comprises
   a lever having a pin on its one end and a projection on the other end, said lever pivotally supported in said casing whereby when said valve is fully closed said pin is pushed by said main valve thereby lift said projection to close the pressure responsive valve irrespective of water pressure.

6. A hot water heating system according to claim 3, wherein
   said valve plate is further formed with a couple of lands on the front surface thereof for interruption of communication of said first passage and of said bypassing passage and a recess for communication with said bypassing passage between said pair of lands.

7. A hot water heating system for use with an internal combustion engine having a cooling water inlet, a cooling water outlet and an engine cooling radiator comprising:
   a heating radiator having a hot water inlet and a hot water outlet,
   a first hot water passage having one end connected to the hot water inlet of said heating radiator,
   a second hot water passage having one end connected to the hot water outlet of said heating radiator, and
   hot water flow control means having a first tube connecting the cooling water outlet of said engine with the other end of said first passage, a second tube connecting the other end of said second passage with the cooling water inlet of said engine, a main valve member disposed in one of said first and second tubes for opening and closing to control hot water flowing through said heating radiator and bypassing means having a bypassing passage and a pressure responsive valve for bypassing the hot water in said first tube to said second tube when the pressure of the hot water exceeds a predetermined value, said main valve member having an additional valve member for closing the bypassing valve when said main valve member fully opens.

* * * * *